(12) United States Patent
Hirata

(10) Patent No.: US 10,119,844 B2
(45) Date of Patent: *Nov. 6, 2018

(54) SCALE FOR AN ABSOLUTE POSITION DETECTION TYPE PHOTOELECTRIC ENCODER WITH THREE OR MORE TWO-BIT COMBINATION PATTERNS ARE USED TO REPRESENT A TWO-LEVEL CODE PATTERN

(71) Applicant: Mitutoyo Corporation, Kawasaki, Kanagawa (JP)

(72) Inventor: Shu Hirata, Kanagawa (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 172 days.

This patent is subject to a terminal disclaimer.

(21) Appl. No.: 15/262,423

(22) Filed: Sep. 12, 2016

(65) Prior Publication Data

US 2017/0074687 A1   Mar. 16, 2017

(30) Foreign Application Priority Data

Sep. 14, 2015  (JP) ................... 2015-180631

(51) Int. Cl.
*G01D 5/347* (2006.01)

(52) U.S. Cl.
CPC ..... *G01D 5/34776* (2013.01); *G01D 5/34707* (2013.01); *G01D 5/34792* (2013.01)

(58) Field of Classification Search
CPC ............. G01D 5/34776; G01D 5/34792
USPC .......... 250/231.13, 239; 341/15, 16
See application file for complete search history.

(56) References Cited

U.S. PATENT DOCUMENTS

| 6,987,465 B2 * | 1/2006 | Mittmann ......... G01D 5/24476 341/15 |
| 2004/0133844 A1 | 7/2004 | Mittmann |

FOREIGN PATENT DOCUMENTS

| EP | 1 876 424 A2 | 1/2008 |
| JP | 5553669 | 6/2014 |

OTHER PUBLICATIONS

European Search Report dated Jan. 13, 2017.
Stevenson J T M et al: "Absolute position measurement using optical detection of coded patterns", Journal of Physics E. Scientific Instruments, IOP Publishing, Bristol, GB, vol. 21, No. 12, Dec. 1, 1988 (Dec. 1, 1988), pp. 1140-1145, XP020018674, ISSN: 0022-3735, DOI: 10.1088/0022-3735/21/12/003. p. 1140 - p. 1142.
European Communication dated May 16, 2018, 4 pages.

* cited by examiner

*Primary Examiner* — Que T Le
(74) *Attorney, Agent, or Firm* — Rankin, Hill & Clark LLP

(57) ABSTRACT

There is provided an absolute position detection type photoelectric encoder which improves robustness to dirt while maintaining high resolution. A two-level code pattern according to a pseudo random code sequence is provided on a scale along a length measurement direction. Each code of the two-level code pattern indicates a code "1" or a code "0", and includes two bits. Each of the two bits is L or H. The code "1" is represented by an A pattern which is a combination of L and H, and the code "0" is represented by a B pattern which is a combination of L and L or a C pattern which is a combination of H and H. When the codes "0" are continued, the B pattern and the C pattern are alternately used.

7 Claims, 17 Drawing Sheets

"1"  A PATTERN
"0" or 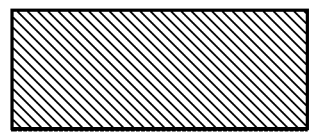 B PATTERN
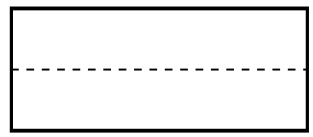 C PATTERN
Fig.6

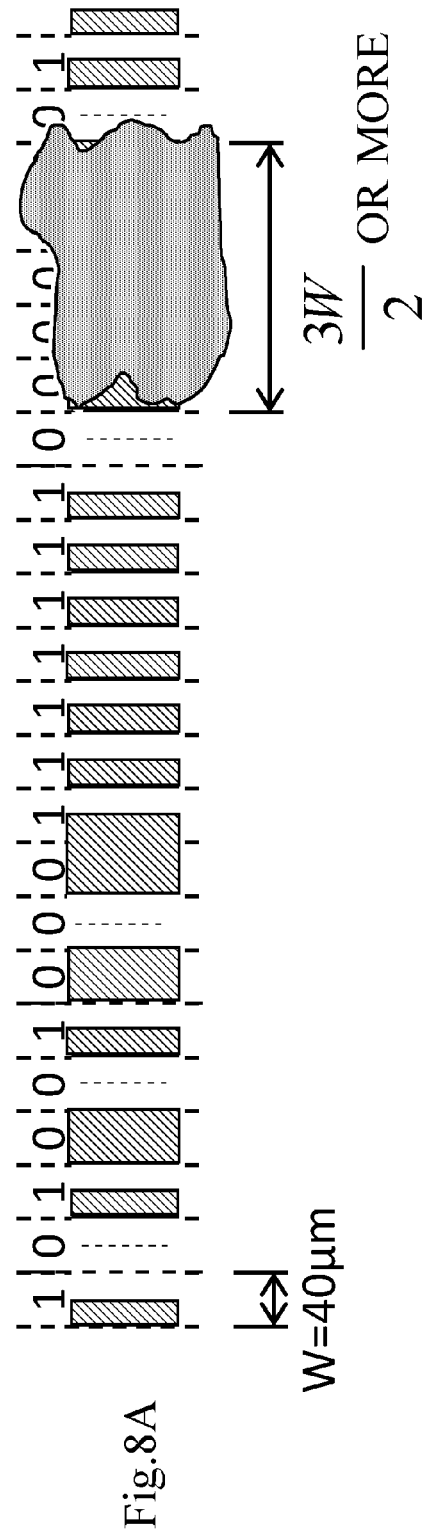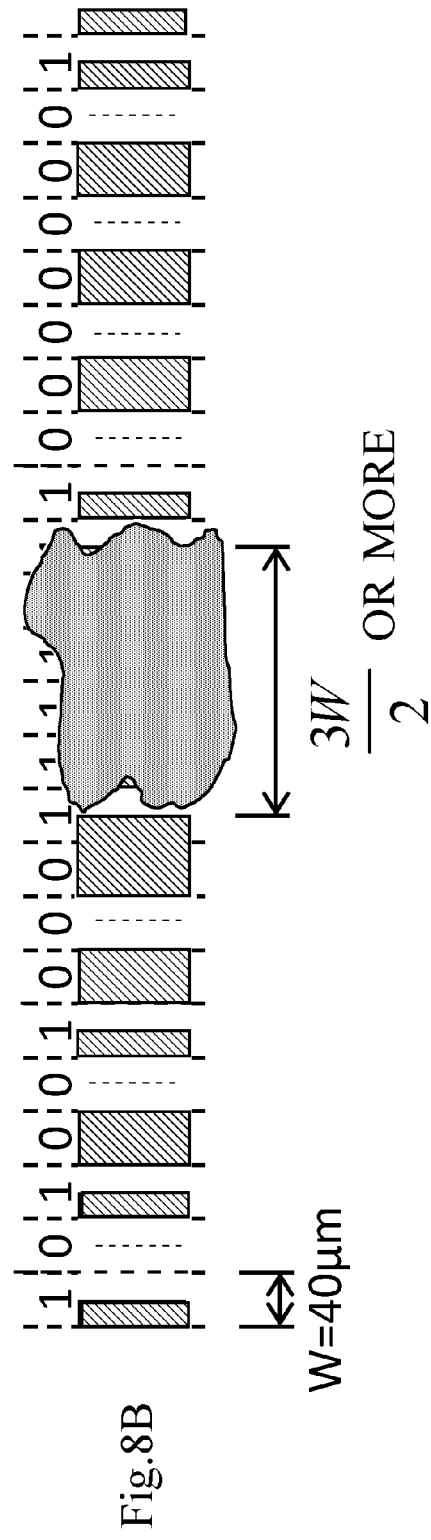

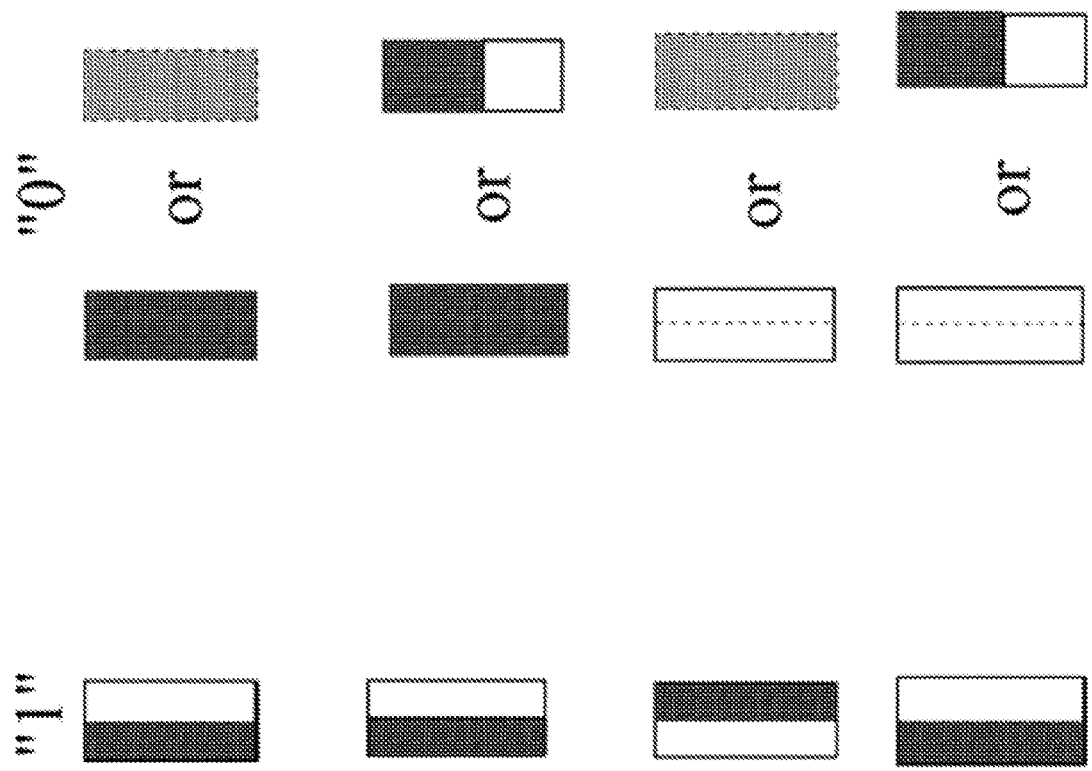

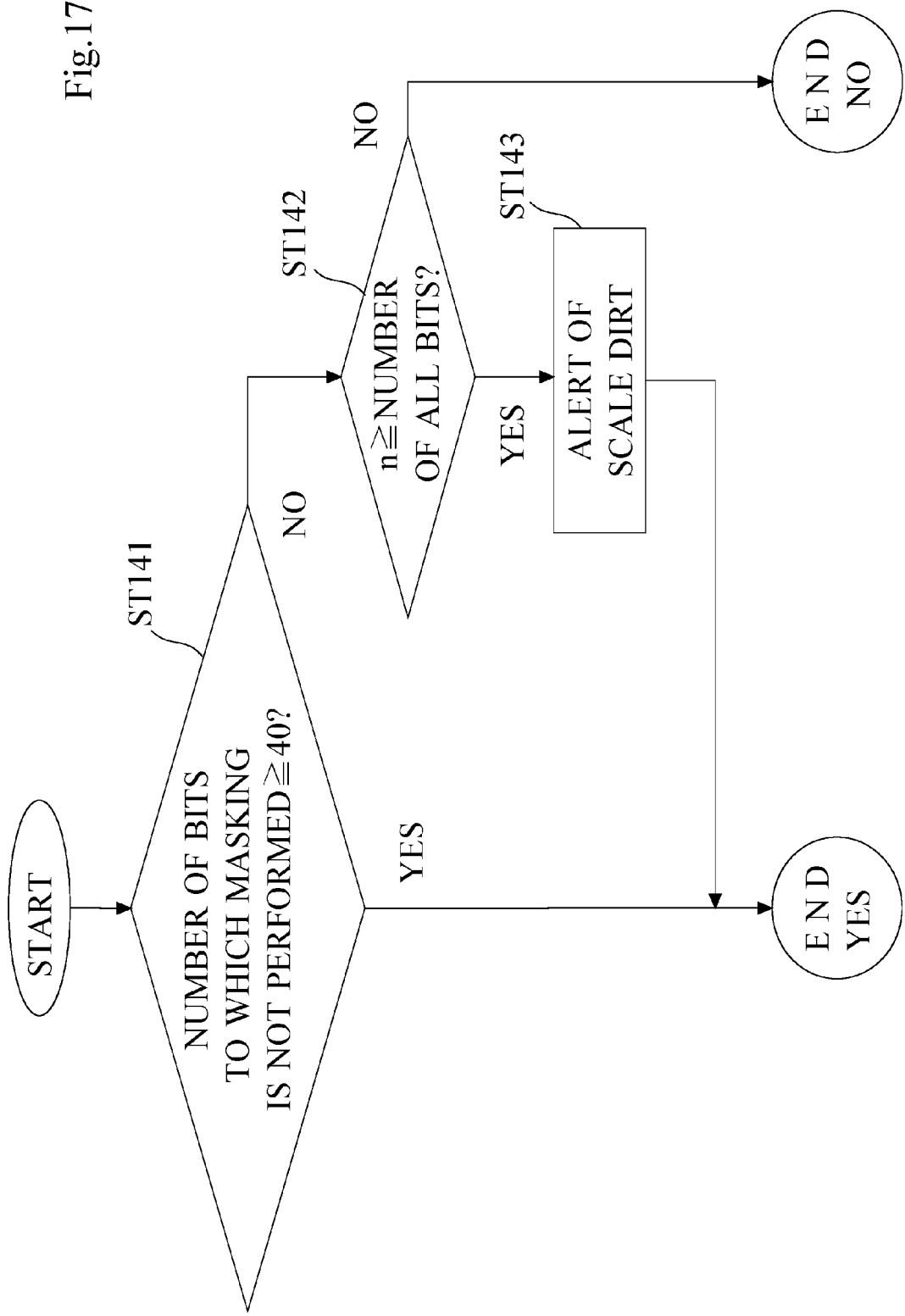

SCALE FOR AN ABSOLUTE POSITION DETECTION TYPE PHOTOELECTRIC ENCODER WITH THREE OR MORE TWO-BIT COMBINATION PATTERNS ARE USED TO REPRESENT A TWO-LEVEL CODE PATTERN

INCORPORATION BY REFERENCE

This application is based upon and claims the benefit of priority from Japanese patent application No. 2015-180631, filed on Sep. 14, 2015, the disclosure of which are incorporated herein in its entirety by reference.

BACKGROUND OF THE INVENTION

1. Field of the Invention

The present invention relates to a position detection apparatus, and specifically, relates to an absolute position detection type (absolute type) photoelectric encoder.

2. Description of Related Art

There is known an absolute position detection type photoelectric encoder using an absolute (ABS) scale (JP 5553669 B). As an ABS scale pattern of the ABS scale, an M-sequence code which is one of pseudo random code sequences has been used.

With reference to FIGS. 1 to 3, a conventional absolute type photoelectric encoder is described. First, as illustrated in FIG. 1, an absolute type photoelectric encoder 100 includes an ABS scale 200 and a detection head part 300 provided to be movable relatively to the length measurement direction along the ABS scale 200.

FIG. 2 is an example of an ABS scale pattern of the ABS scale 200. As the ABS scale pattern, an M-sequence code which is one of pseudo random code sequences is used. When N number of continuous codes in the M-sequence code pattern are extracted, the pattern formed by the N number of codes appears once in a period of the M-sequence code pattern.

In the example of FIG. 2, codes of "1" and "0" are each represented by two bits in the ABS scale pattern in which the codes "1" and "0" are randomly arranged.

The two bits of the code "1" are a combination of a transmitting part (light-transmissive part) and a reflecting part. On the other hand, the two bits of the code "0" are both the transmitting parts.

Here, for the sake of description below, the transmitting part (light-transmissive part) is referred to as a dark part (or "L"), and the reflecting part is referred to as a bright part (or "H").

The detection head part 300 includes a light source 310, a lens 320, a light receiving part 330, and a signal processing unit 400.

The light source 310 emits light toward the ABS scale 200. The light is reflected at the reflecting part of the ABS scale 200 and transmitted at the transmitting part. The reflected light enters a light receiving surface of the light receiving part 330 through the lens 320.

On the light receiving surface of the light receiving part 330, a bright and dark image pattern is formed according to the ABS scale pattern.

FIG. 3 illustrates the light receiving surface of the light receiving part 330.

A photodiode array 340 is provided on the light receiving surface of the light receiving part 330. The photodiode array 340 is formed by arranging photodiodes 341 at a pitch with which a pitch of the ABS scale pattern can be detected. Each of the photodiodes 341 constituting the photodiode array 340 includes a switch 342, and is connected to the signal processing unit 400 through the switch 342. By sequentially turning the switch 342 ON, a light receiving signal from each of the photodiodes 341 is swept.

The signal processing unit 400 includes an image acquisition unit 410 and a correlation calculation unit 420. The correlation calculation unit 420 stores design data of the ABS scale pattern as a reference pattern in advance. The correlation calculation unit 420 performs correlation calculation between a signal pattern acquired at the light receiving part 330 and the reference pattern, and obtains a position from a peak of the correlation. The absolute position on the ABS scale pattern is acquired in this manner.

SUMMARY OF THE INVENTION

While the ABS photoelectric encoder is used, the ABS scale pattern can become dirty due to dust or the like entering between the ABS scale 200 and the detection head part 300. If dirt adheres to the ABS scale pattern, the signal pattern acquired at the light receiving part 330 changes under the influence of the dirt. If correlation calculation is performed based on the signal pattern having changed due to the dirt, a peak of the correlation appears at an incorrect position, and which increases the possibility of falsely detecting the position.

For example, an example is illustrated in FIG. 4.

As illustrated in the lower row of FIG. 4A, the dirt adheres to the scale pattern, but this part is originally non-reflecting parts and the signal pattern does not change in the end. However, as illustrated in FIG. 4B, when the dirt adheres to the part which is originally the reflecting parts, the signal pattern changes, and which can lead to false detection.

For that reason, there have been proposed methods to avoid falsely detecting a position due to dirt.

One of the methods is to sufficiently increase the number of codes used for correlation calculation. However, as the number of codes used for correlation calculation is increased, the calculation amount is increased accordingly. Furthermore, no matter how the number of codes used for correlation calculation is increased, false detection is inevitable.

As another method, in JP 5553669 B, there has been proposed a method to divide an ABS scale pattern at a certain pitch, and shift a part of the pattern to the length measurement direction. However, position resolution of the ABS scale inevitably becomes coarse with this method.

A purpose of the present invention is to provide an absolute position detection type photoelectric encoder which improves robustness to dirt while maintaining high resolution.

A scale according to an aspect of the present invention is a scale used for an absolute position detection type photoelectric encoder, the scale includes:

a two-level code pattern, according to a pseudo random code sequence, provided along a length measurement direction, in which each code in the code pattern consists of a combination of two bits, and three or more bit combination patterns are used to represent the two-level code.

In an aspect of the present invention, it is preferable that each code of the two-level code pattern indicates a code "1" or a code "0", each code includes two bits, each of the two bits is L or H, the number of continuous L in the two-level code pattern is equal to or less than an upper limit value, and the number of continuous H in the two-level code pattern is equal to or less than an upper limit value.

In an aspect of the present invention, it is preferable that two or more combination patterns of the two bits representing the code "0" are prepared, and a combination pattern different from an adjacent combination pattern is used when the codes "0" are continued.

In an aspect of the present invention, it is preferable that the code "1" is represented by an A pattern which is a combination of L and H, the code "0" is represented by a B pattern which is a combination of L and L, or by a C pattern which is a combination of H and H, and the B pattern and the C pattern are alternately used when the codes "0" are continued.

In an aspect of the present invention, it is preferable that each code of the two-level code pattern indicates a code "1" or a code "0", each code includes two bits, each of the two bits is L, H, or M, the code "1" is represented by an A pattern which is a combination of L and H, the code "0" is represented by two or more patterns selected from a B pattern which is a combination of L and L, a C pattern which is a combination of H and H, and a D pattern which is a combination of M and M, and a combination pattern different from an adjacent combination pattern is used when the codes "0" are adjacently continued.

In an aspect of the present invention, it is preferable that the code "1" and the code "0" are replaceable with each other.

A photoelectric encoder in an aspect of the present invention includes:

the scale; and a detection unit provided to be relatively movable along the scale and configured to detect an absolute position on the scale based on the pseudo random code sequence on the scale.

BRIEF DESCRIPTION OF THE DRAWINGS

FIG. 6 is a diagram illustrating examples of bit patterns each representing a code;

FIG. 8A is a diagram explaining an effect of an embodiment of the present invention;

FIG. 8B is a diagram explaining an effect of an embodiment of the present invention;

FIG. 10A is a diagram explaining a modified example;
FIG. 10B is a diagram explaining a modified example;
FIG. 10C is a diagram explaining a modified example;
FIG. 10D is a diagram explaining a modified example.

FIG. 17 is a flowchart explaining the third exemplary embodiment.

DETAILED DESCRIPTION

Figure 1:
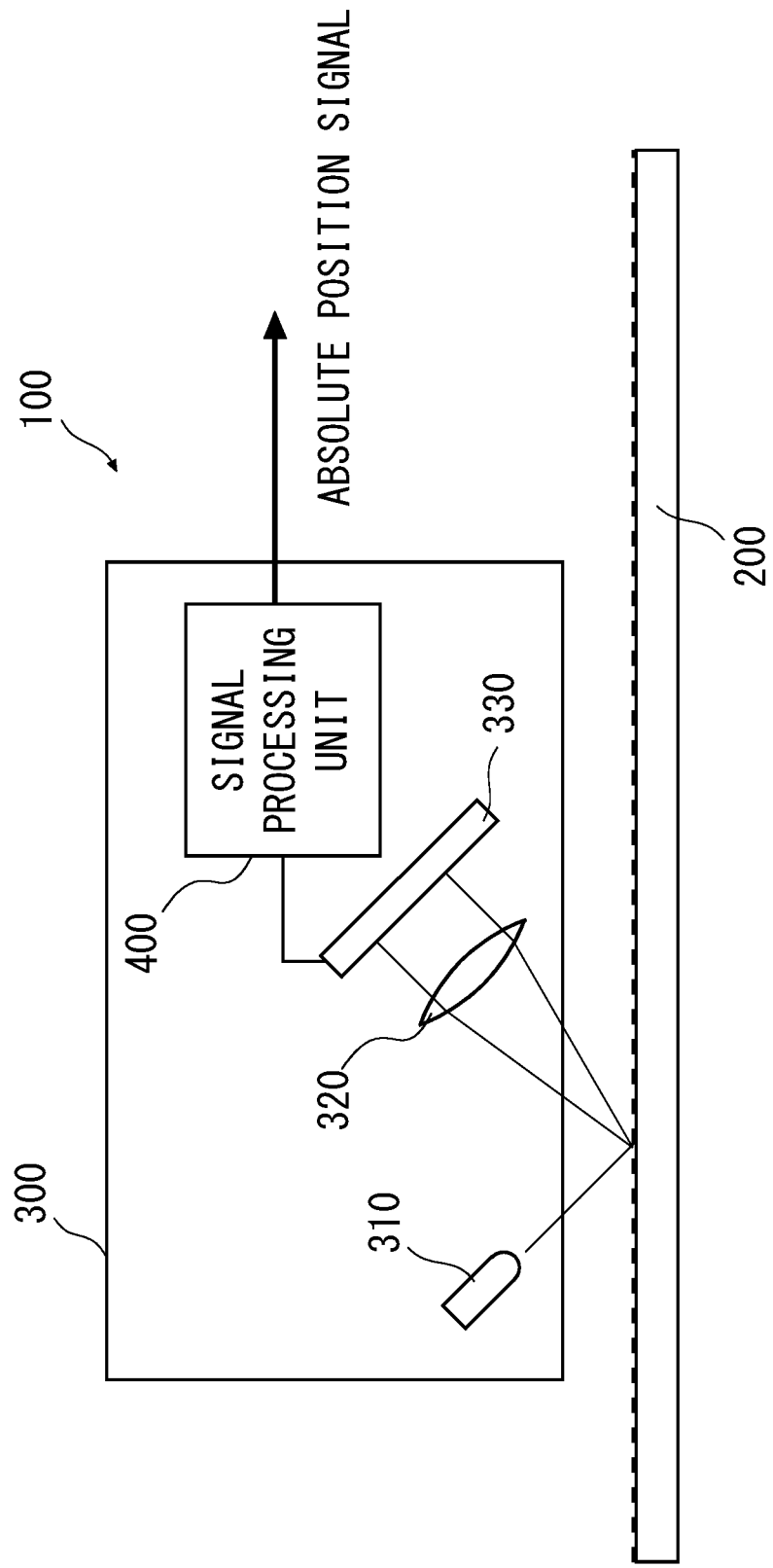
FIG. 1 is a diagram illustrating a configuration of an absolute type photoelectric encoder.

Embodiments of the present invention are illustrated, and described with reference to reference signs attached to the elements in the drawings.

First Exemplary Embodiment

With reference to FIGS. 5 to 8, a first exemplary embodiment of the present invention is described below.

Figure 2:
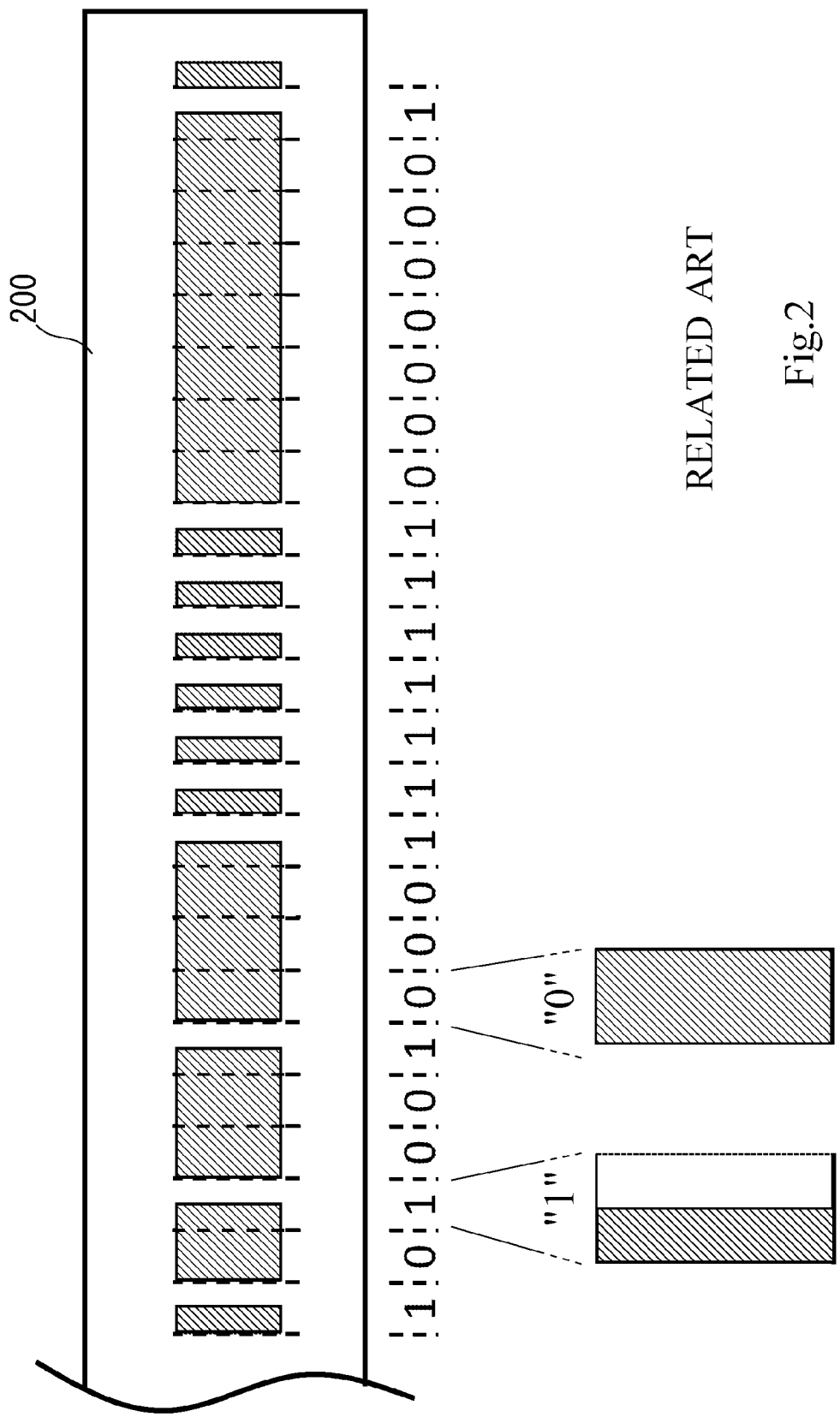
FIG. 2 is a diagram illustrating an example of an ABS scale pattern of an ABS scale.
Figure 3:
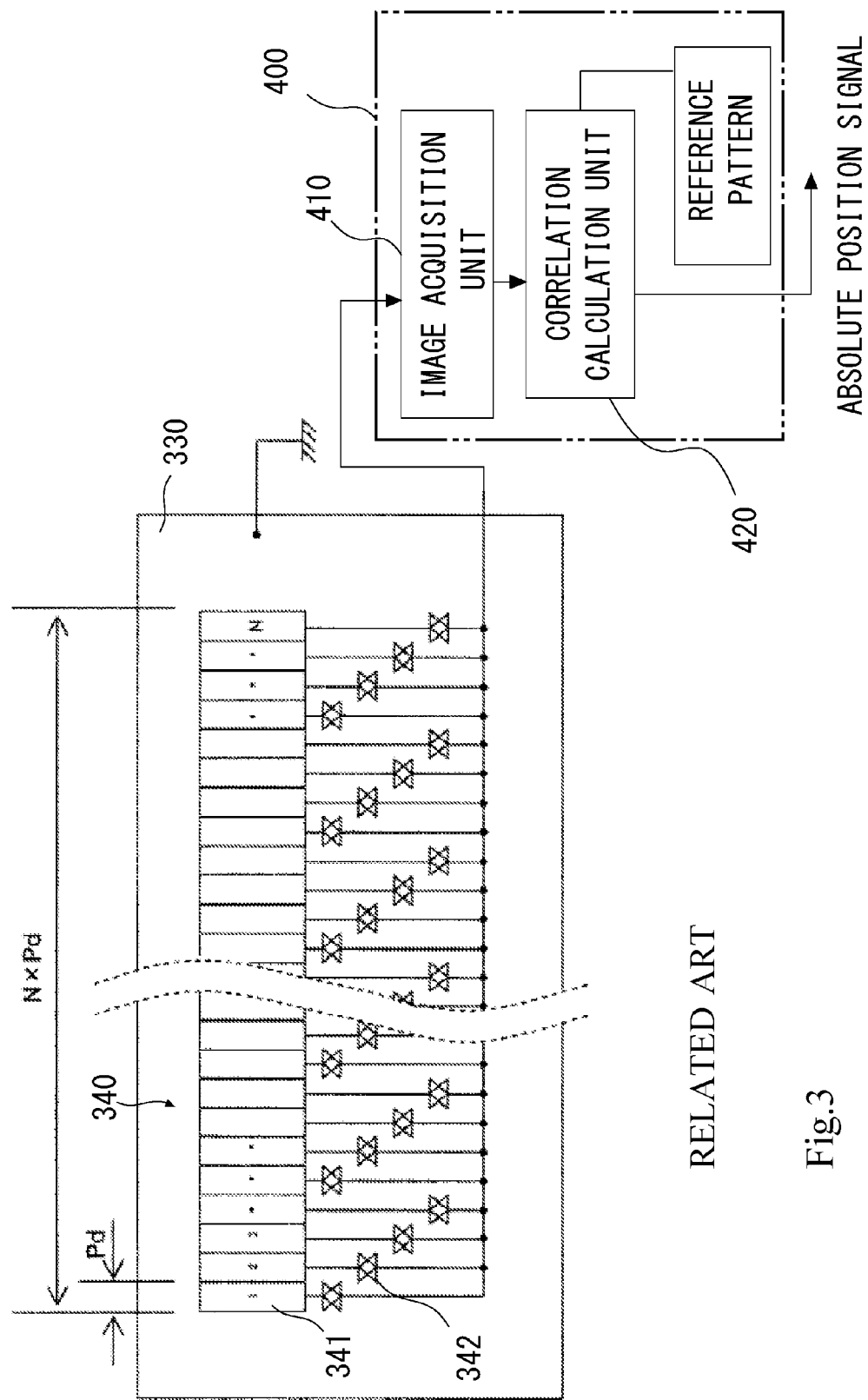
FIG. 3 is a diagram illustrating a light receiving surface of a light receiving part.
Figure 4A:
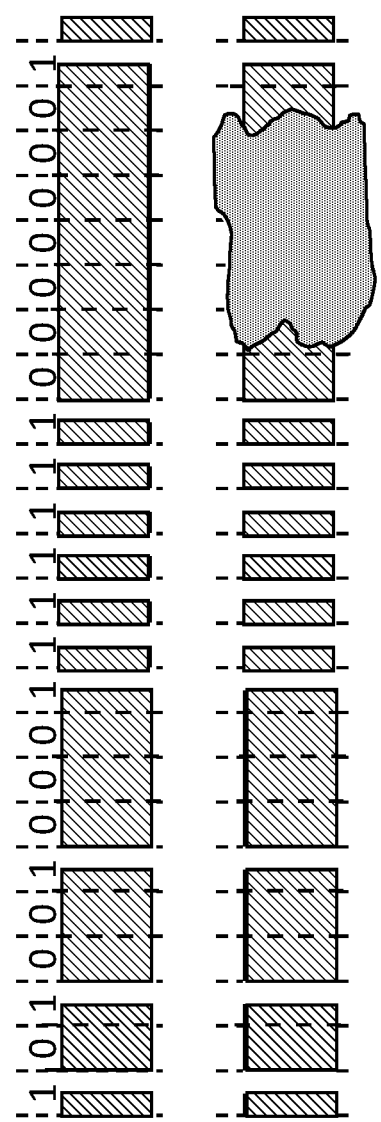
FIG. 4A is a diagram illustrating that dirt adheres to a scale pattern.
Figure 4B:
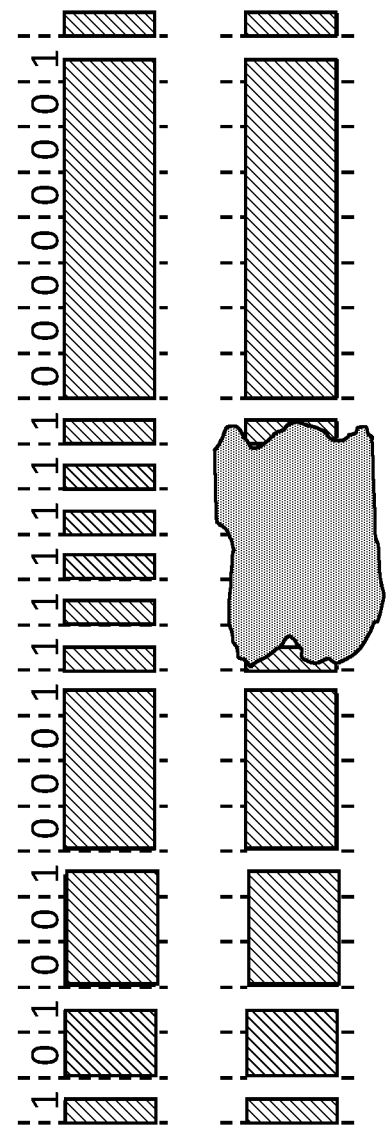
FIG. 4B is a diagram illustrating that dirt adheres to a scale pattern.

A basic configuration according to the present embodiment is the same as that described with reference to FIGS. 1 to 3.

A feature of the present embodiment is the way to form an ABS scale pattern, specifically, the way to represent codes of "1" and "0" on the ABS scale pattern.

Figures 5A, 5B:
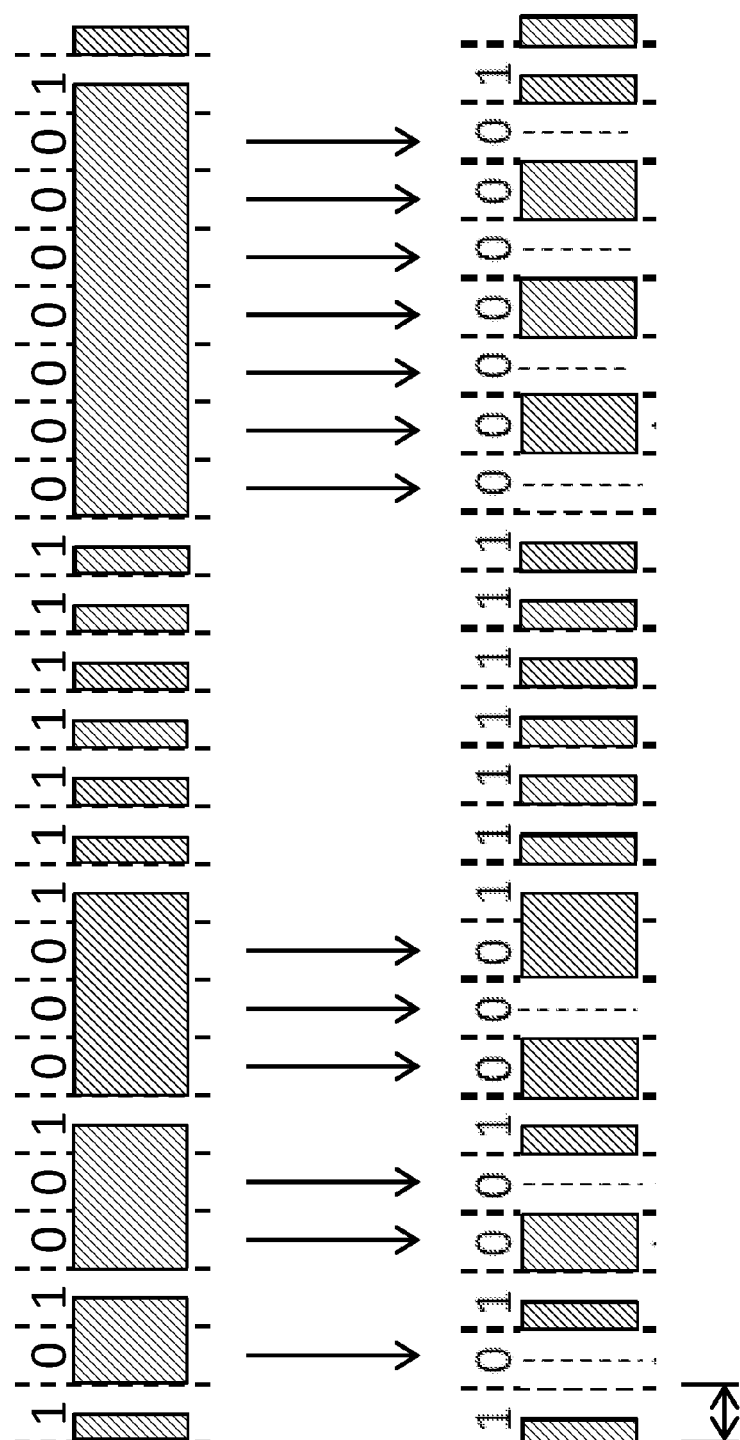
FIG. 5A is a diagram illustrating an example of an ABS scale pattern formed with a represent method based on a conventional manner.
FIG. 5B is a diagram illustrating an example of an ABS scale pattern formed with a method according to an embodiment of the present invention.

FIG. 5A illustrates an ABS scale pattern formed with a represent method based on a conventional manner.

FIG. 5B illustrates an example of the ABS scale pattern formed with a method according to the present embodiment.

In the conventional manner of FIG. 5A, as described above, the codes "1" and "0" are each represented by two bits, the two bits of the code "1" are a combination of a dark part (L) and a bright part (H), and the two bits of the code "0" are both the dark parts.

In the ABS scale pattern in FIG. 5B according to the present embodiment, the code "1" is a combination of a dark part and a bright part similarly to the conventional manner. This combination of (bright, dark) is referred to as an A pattern.

The way to represent the code "0" is different from that in the conventional manner.

As illustrated in FIG. 6, two patterns to represent the code "0" are prepared. The code "0" is represented by a B pattern in which the two bits are both the dark parts and by a C pattern in which the two bits are both the bright parts. The B pattern is a combination of (dark, dark), and the C pattern is a combination of (bright, bright).

In this manner, the same code "0" is represented by using the two patterns.

Figure 7:
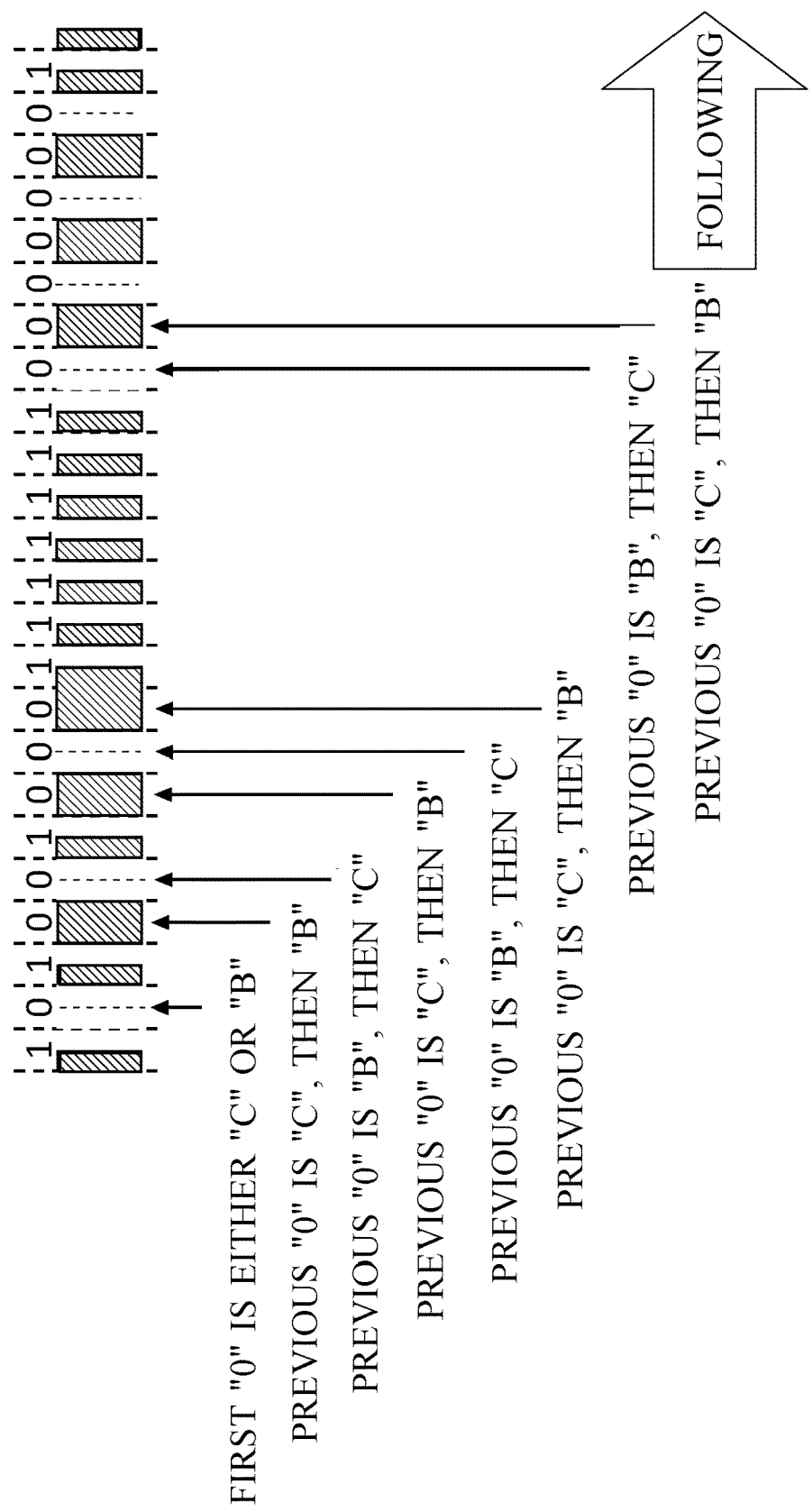
FIG. 7 is a diagram explaining an arrangement rule of a B pattern and a C pattern which represent "0"

FIG. 7 is a diagram explaining a design rule to determine which one of the B pattern or the C pattern is arranged to represent the code "0".

To represent the code "0", by referring to the immediately previous code "0" (here, at the left side), the B pattern and the C pattern are to be alternately arranged.

In the example of FIG. 7, the leftmost code "0" can be either one of the two patterns, and is assumed to be the C pattern.

The right of this code "0" is the code "1", and the A pattern is arranged.

The code "0" on the right of this code "1" is described.

By referring to the left side of this code "0", the immediately previous code "0" is the C pattern. Thus, the B pattern is used for this code "0". Furthermore, to represent the code "0" on the right of this code "0", the C pattern different from the previous B pattern is used.

In this manner, to represent a code "0", by using a pattern different from that used for the immediately previous code "0" at the left side, the number of continuous dark parts or continuous bright parts is three at the maximum.

In other words, when four or more bright parts or dark parts are continued in the signal pattern detected at the light receiving part 330, the pattern deviates from the design rule, and it can be determined that the pattern is affected by some kind of dirt.

As illustrated in FIG. 8A, the dirt adheres to the part of the codes "0". If all of the codes "0" are the non-reflecting parts, whether the pattern is the code 0 or dirt cannot be distinguished from the signal pattern. In this case, the signal pattern does not change in the conventional manner in the end, but the result is merely a coincidence.

In contrast, the ABS scale according to the present embodiment does not have continuous four or more dark parts. Thus, it can be determined that the continuous four or more dark parts are dirt.

As illustrated in FIG. 8B, the dirt adheres to the part of the codes "1". In this case, the signal pattern changes obviously.

Naturally in this case, it is determined that continuous four or more dark parts are dirt, and it is possible not to use the result for correlation calculation.

In other words, the incorrect "0" which is originally "1" is not used for correlation calculation. As a result, the case in which a peak of the correlation appears at a wrong position in the correlation calculation does not happen. Thus, a wrong position is not recognized in the position detection.

Note that, it has been assumed that the dirt becomes the non-reflecting parts in the above description. However, the same effect can be obtained when the dirt reflects light in the present embodiment. In other words, in accordance with the design rule of the present embodiment, four or more bright parts are not continued. If four or more bright parts are continued, it can be determined that that the pattern is affected by dirt.

By using the ABS scale according to the present embodiment in this manner, it is possible not to use incorrect data due to dirt for correlation calculation. Thus, the accuracy (reliability) of the position detection is improved.

Furthermore, by alternately using the B pattern and the C pattern which represent the code "0" in the present embodiment, the appearance frequency of the bright part is substantially equal to that of the dark part. This facilitates the setting of a threshold from the received-light intensity to perform quantization, and it is possible to reduce the load on the signal processing unit 400 or simplify the signal processing unit 400.

Modified Example 1

Next, a modified example 1 is described below.
FIG. 9 is a diagram explaining the modified example 1.

In the above described embodiment, the B pattern and the C pattern which represent the code "0" are necessarily alternately arranged.

In the modified example 1, the flexibility when the B pattern or the C pattern is selected may be enhanced as long as four or more dark parts or four or more bright parts are not continued.

Figure 9A:
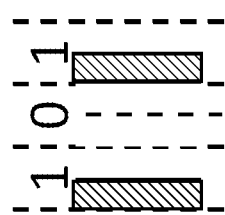
FIG. 9A is a diagram explaining a modified example.
Figure 9B:
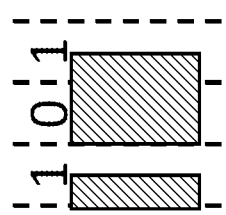
FIG. 9B is a diagram explaining a modified example.

For example, as illustrated in FIGS. 9A and 9B, when the code "0" is separately isolated, that is, when both sides of the code "0" are the codes "1", either of the B pattern or the C pattern may be used to represent the code "0". In either case, four or more bright parts or four or more dark parts are not continued.

Figure 9C:
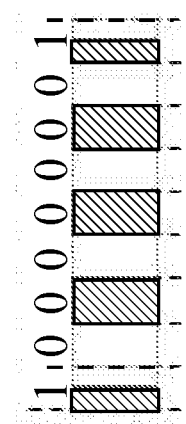
FIG. 9C is a diagram explaining a modified example.

However, as illustrated in FIG. 9C, when two or more codes "0" are continued, the B pattern and the C pattern need to be alternate.

As long as at least the design rule is followed, four or more bright parts or four or more dark parts are not continued.

Modified Example 2

A modified example 2 is described below.

A feature of the modified example 2 is to use three patterns to represent the two codes of "1" and "0".

Thus, for example, the patterns may be the patterns as illustrated in FIG. 10A.

In FIG. 10A, two patterns are used to represent the code "0"; both two bits are the dark parts (the B pattern), and both two bits are halftone parts. The pattern in which both two bits are the halftone parts is referred to as a D pattern.

In other words, the B pattern and the D pattern are alternately used to represent the code "0".

The bright part and the dark part are represented as "H" and as "L" respectively, and the halftone part (an intermediate part) is represented as "M".

Alternatively, the patterns may be the patterns illustrated in FIG. 10B.

In other words, the halftone parts constituting the two bits are not implemented by a layer having reflectivity of about 50%, but may be implemented by forming the upper half parts and the lower half parts of the dark parts and the bright parts respectively.

The patterns illustrated in FIGS. 10A and 10B may be further modified as the patterns illustrated in FIGS. 10C and 10D.

To represent the code "1", the order of a pattern is not the dark part and the bright part, but may be the bright part and dark part.

This pattern is referred to as an A' pattern.

Furthermore, to represent the code "0", the C pattern may be used instead of the B pattern.

Note that, in the description above, it is needless to say that the code "1" and the code "0" are replaceable with each other.

Second Exemplary Embodiment

Next, a second exemplary embodiment of the present invention is described below.

As the second exemplary embodiment, a signal processing operation using dirt determination is exemplified.

Figure 11:
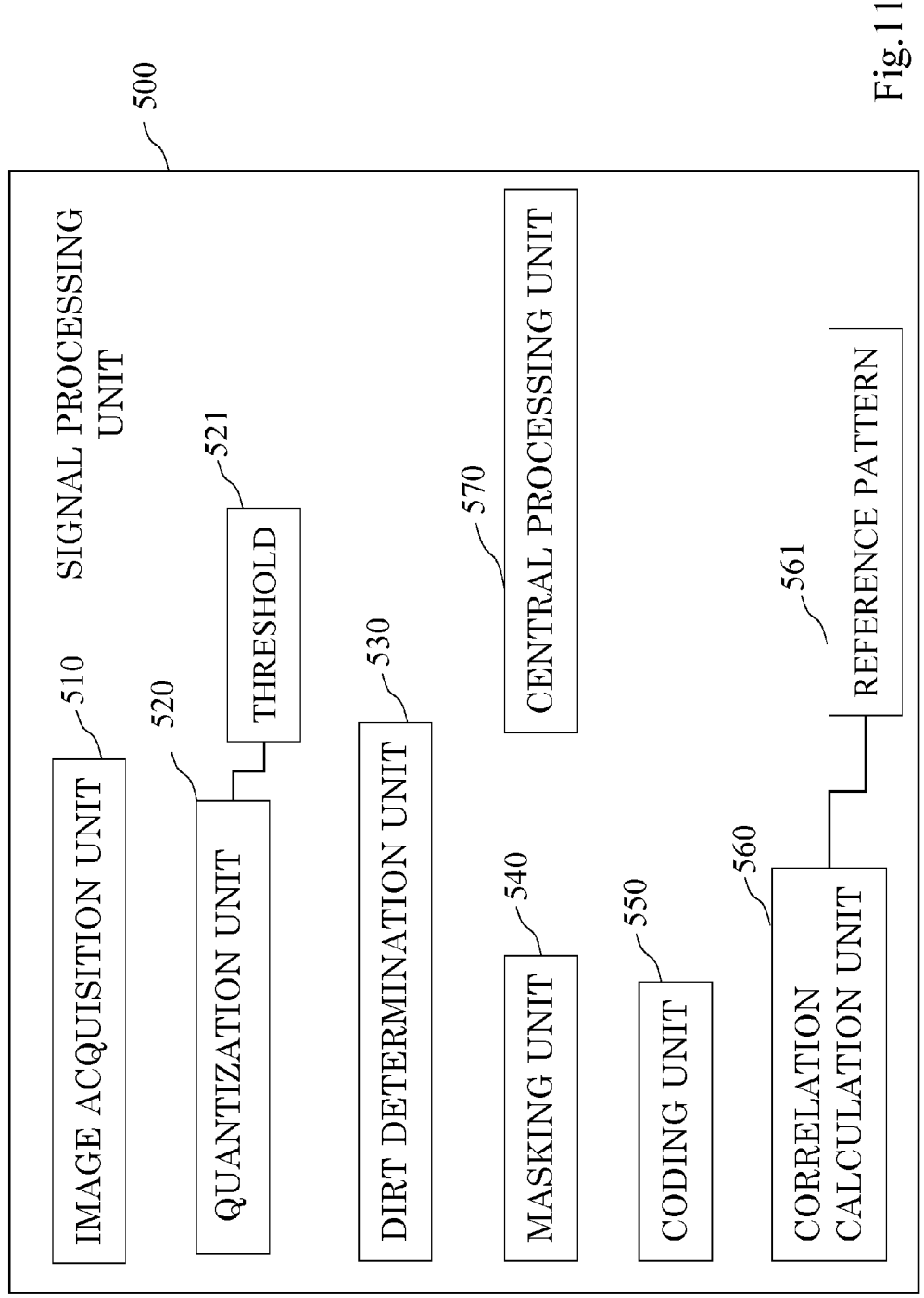
FIG. 11 is a functional block diagram of a signal processing unit.

FIG. 11 is a functional block diagram of a signal processing unit 500 in the second exemplary embodiment.

The signal processing unit 500 includes an image acquisition unit 510, a quantization unit 520, a dirt determination unit 530, a masking unit 540, a coding unit 550, a correlation calculation unit 560, and a central processing unit 570.

The signal processing unit 500 has mainly a CPU, a ROM, and a RAM, and operates as the above functional units by loading arithmetic programs.

The operations of the functional units are described with reference to the flowchart in FIG. 12.

Figure 12:
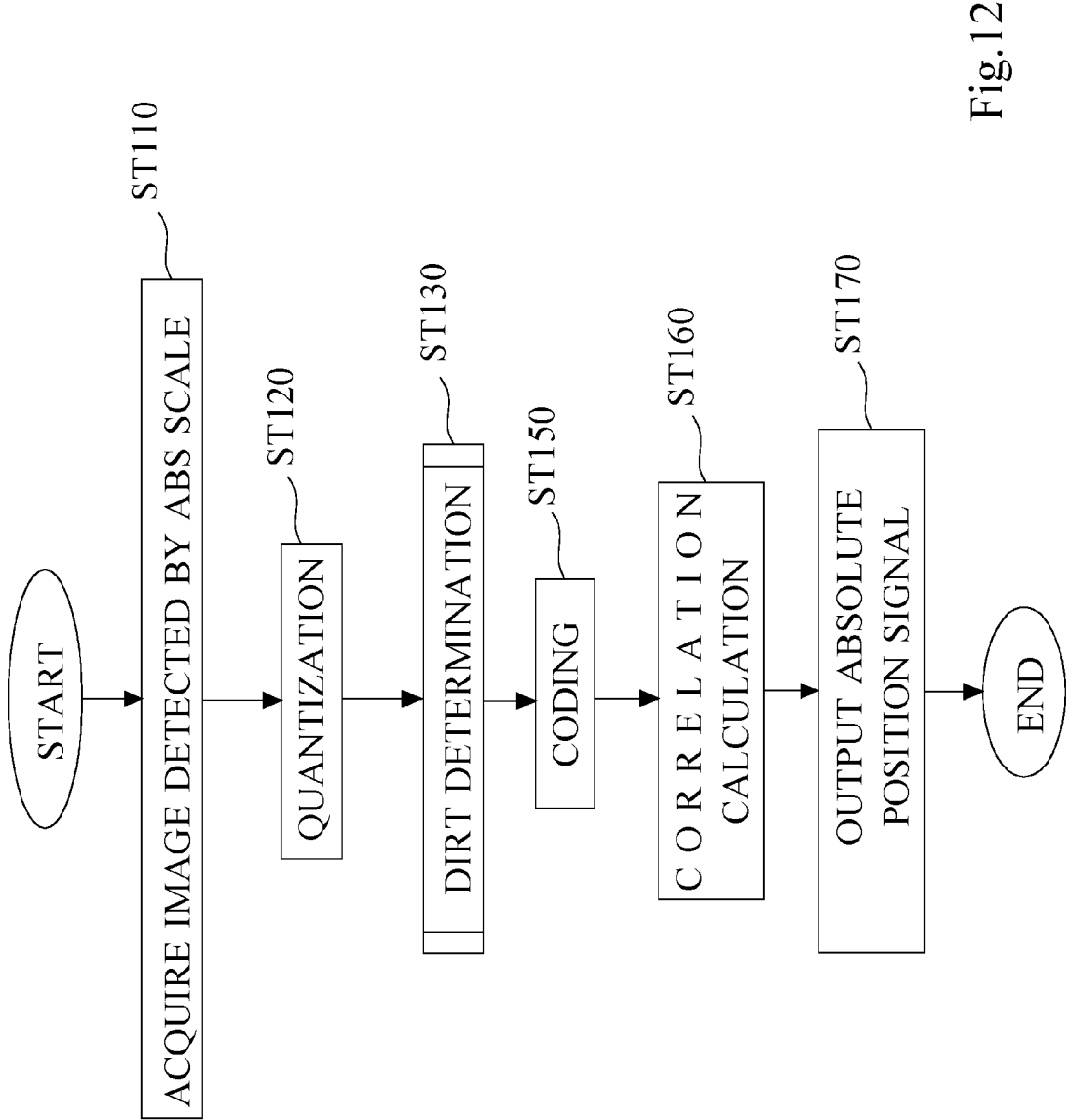
FIG. 12 is a flowchart explaining an operation procedure of a signal processing unit.

FIG. 12 is the flowchart explaining an operation procedure of the signal processing unit 500.

First, the image acquisition unit 510 sequentially sweeps signals from the photodiode array 340 of the light receiving part 330, and acquires images detected by the ABS scale 200 (ST110). Then, the quantization unit 520 sequentially quantizes the acquired detected images (ST120). Here, it is assumed that an appropriate threshold to the received-light intensity has been set. By comparison with the threshold, the dark part and the bright part are distinguished from each other and binarized. Here, for the sake of description below, the dark part is referred to as "L", and the bright part is referred to as "H".

Figure 14:
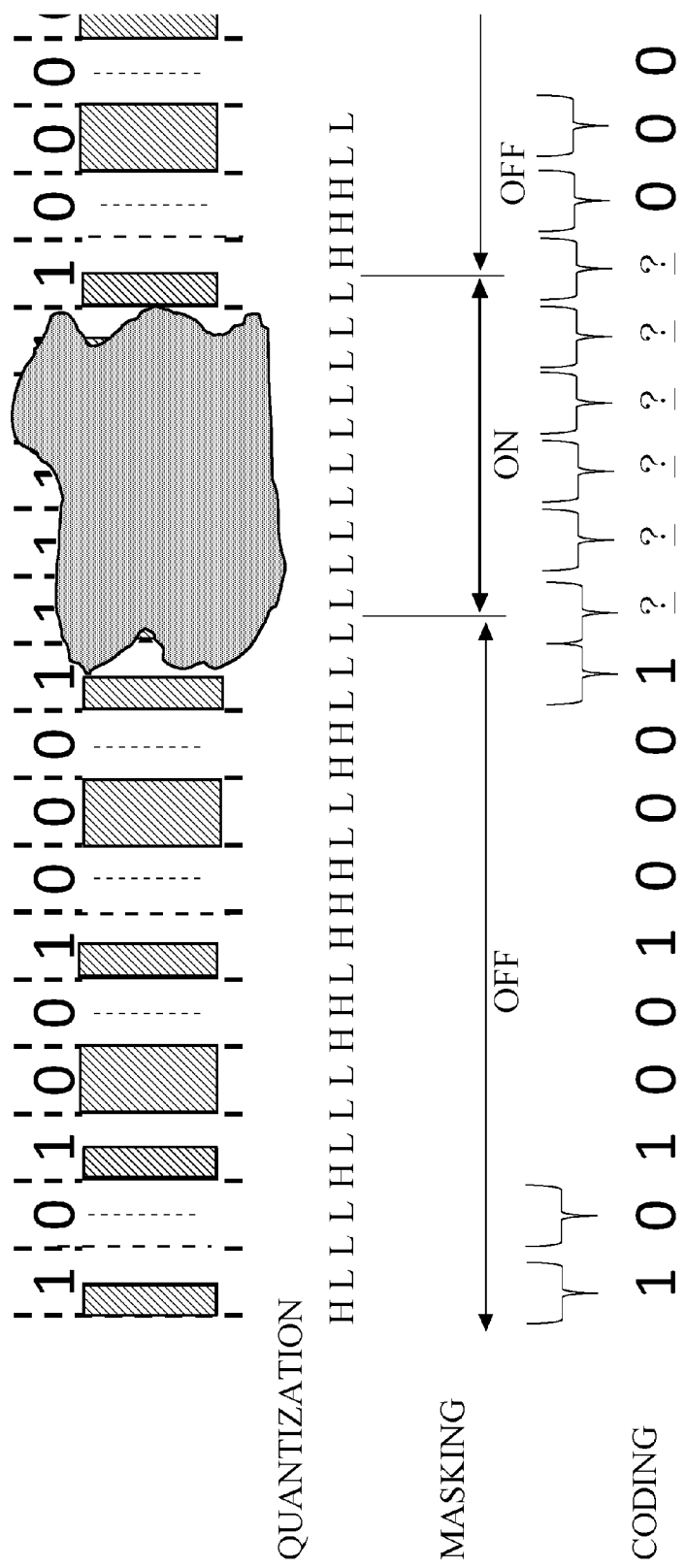
FIG. 14 is a diagram illustrating examples of quantization, masking, and coding.

Then, the images are quantized as illustrated in the second row in FIG. 14.

In the example of FIG. 14, the dirt adheres to a part of the ABS scale 200. When the received-light intensity at the photodiode 341 is lower than the threshold, the quantized value thereof is naturally "L". The result is the same as that in the conventional manner.

Following the quantization (ST120), dirt determination is performed by the dirt determination unit 530 (ST130).

Figure 13:
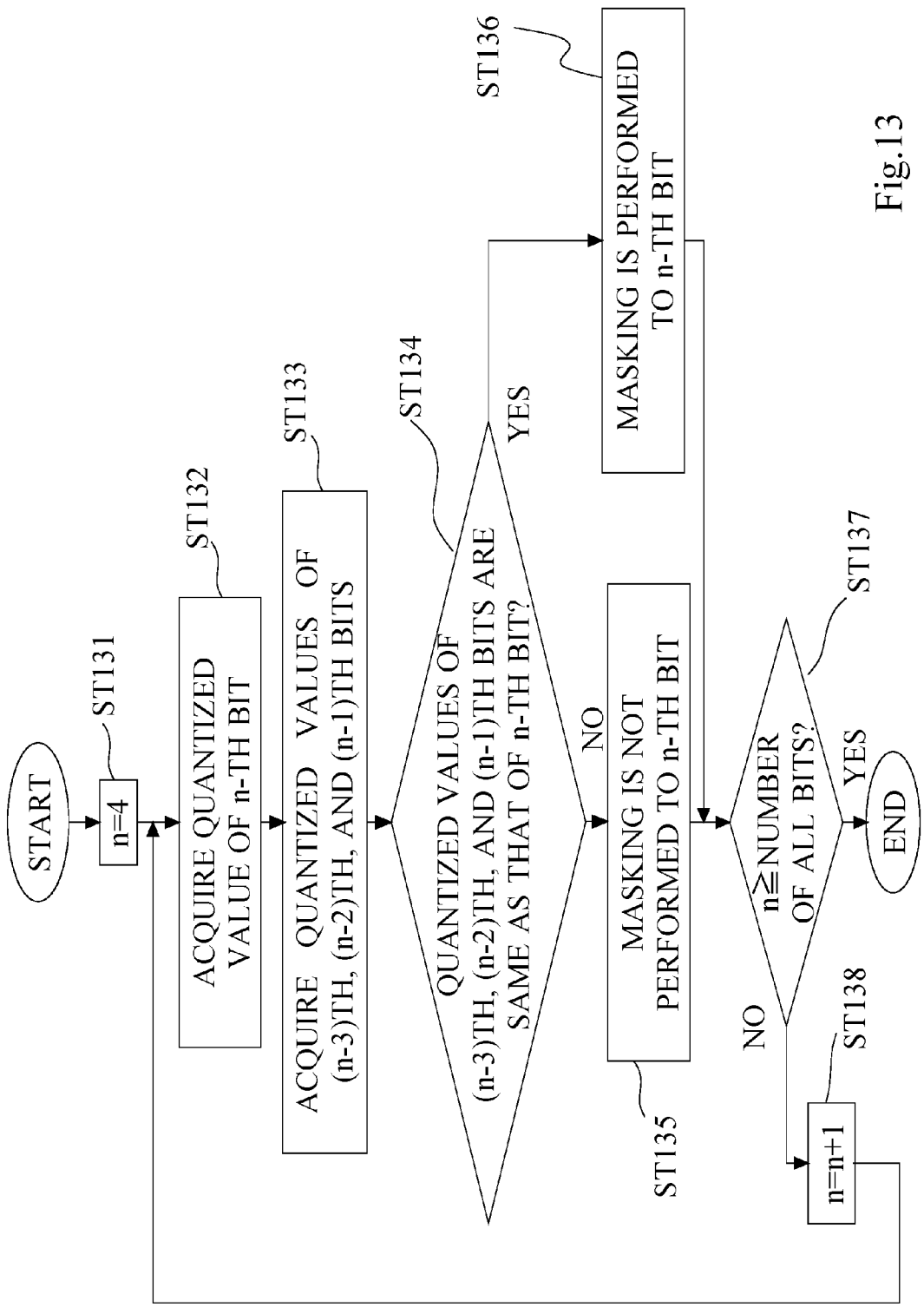
FIG. 13 is a flowchart explaining a procedure of dirt determination processing.

With reference to the flowchart in FIG. 13, dirt determination processing (ST130) is described below. FIG. 13 is the flowchart explaining a procedure of the dirt determination processing (ST130).

To perform the dirt determination processing (ST130), first, a parameter n is initialized to count bits.

The parameter n is initialized to n=4, for the sake of following processing.

Here, it is assumed that the quantized values in FIG. 14 are numbered in order from the left end as 1, 2, 3, . . . .

The dirt determination unit 530 acquires the quantized value of n-th bit (ST132). Here, it is assumed that n equals four, and the quantized value of the fourth bit is "L".

Next, the dirt determination unit 530 acquires the quantized values of the (n-3)th, the (n-2)th, and the (n-1)th bits, that is, the quantized values of the continuous four bits (ST133). Here, n equals four, and the dirt determination unit 530 acquires the quantized values of the first bit, the second bit, and the third bit (ST133).

Then, the dirt determination unit 530 determines whether the quantized values of the continuous four bits are the same.

In the design rule of the ABS scale pattern, the maximum number of continuous quantized values having the same value is three, and four or more quantized values having the same value (L or H) are not continued. Therefore, the n-th bit to be determined is compared to the quantized values of the immediately previous three bits.

When all of the quantized values of the (n-3)th to n-th bits are not the same (ST134: NO), the pattern is possible at least in the design rule and is reliable, and the quantized value of the n-th bit is not masked (ST135).

On the other hand, when all of the quantized values of the (n-3)th to n-th bits are the same (all H or all L) (ST134: YES), the quantized value of the n-th bit deviates from the design rule and cannot be reliable, and it is determined that the pattern is affected by dirt.

In this case, the quantized value of the n-th bit is masked not to be used (ST136).

The processing of ST132 to ST138 is repeated until the parameter n reaches the number of all bits of the acquired images. When the parameter n reaches the number of all bits of the acquired images, the dirt determination is terminated (ST137: YES).

The third row in FIG. 14 illustrates ON/OFF of masking.

When the dirt determination is terminated (ST130), then, coding is performed by the coding unit 550 (ST150). To perform coding, the quantized value of an unmasked bit is used.

One code is represented by two bits.

A pair of (L, H) is converted into the code "1".

Pairs of (L, L) and (H, H) are converted into the code "0".

The fourth row in FIG. 14 illustrates an example of a coded result.

By the masking (ST136), quantized values are unknown in some part. Naturally, in the part of the masked bits, the codes are unknown. In FIG. 14, the unknown values are represented by "?".

The correlation calculation between the coded data and the reference pattern is performed in this manner (ST160). The position indicating the highest correlation in the correlation calculation is calculated as the current absolute position (ST170).

By performing the processing in the second exemplary embodiment, it is possible to distinguish the uncertain code due to dirt. Furthermore, it is possible not to use the uncertain code for correlation calculation. Thus, the accuracy (reliability) of the position detection is improved.

Third Exemplary Embodiment

Figure 15:
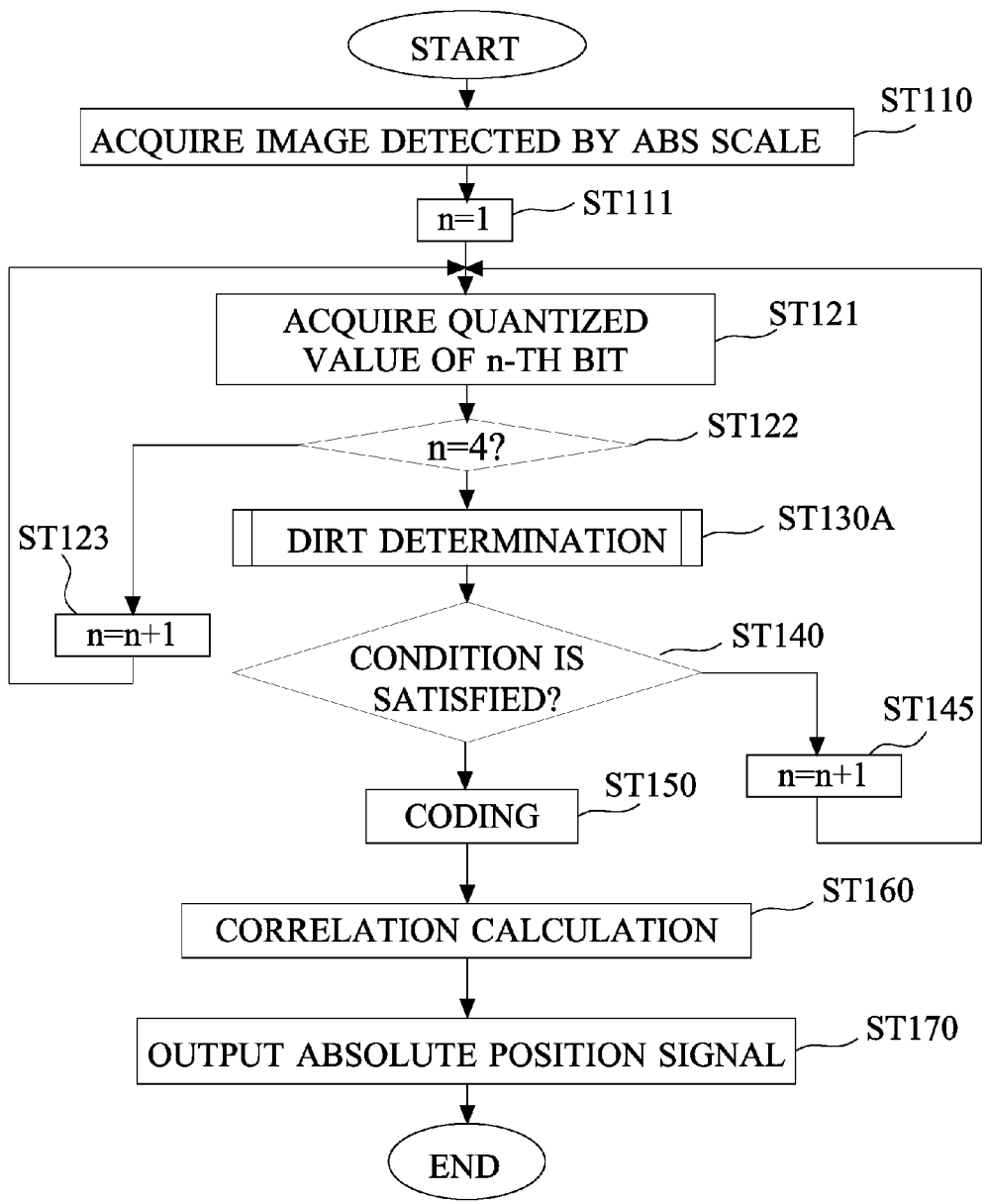
FIG. 15 is a flowchart explaining a third exemplary embodiment.
Figure 16:
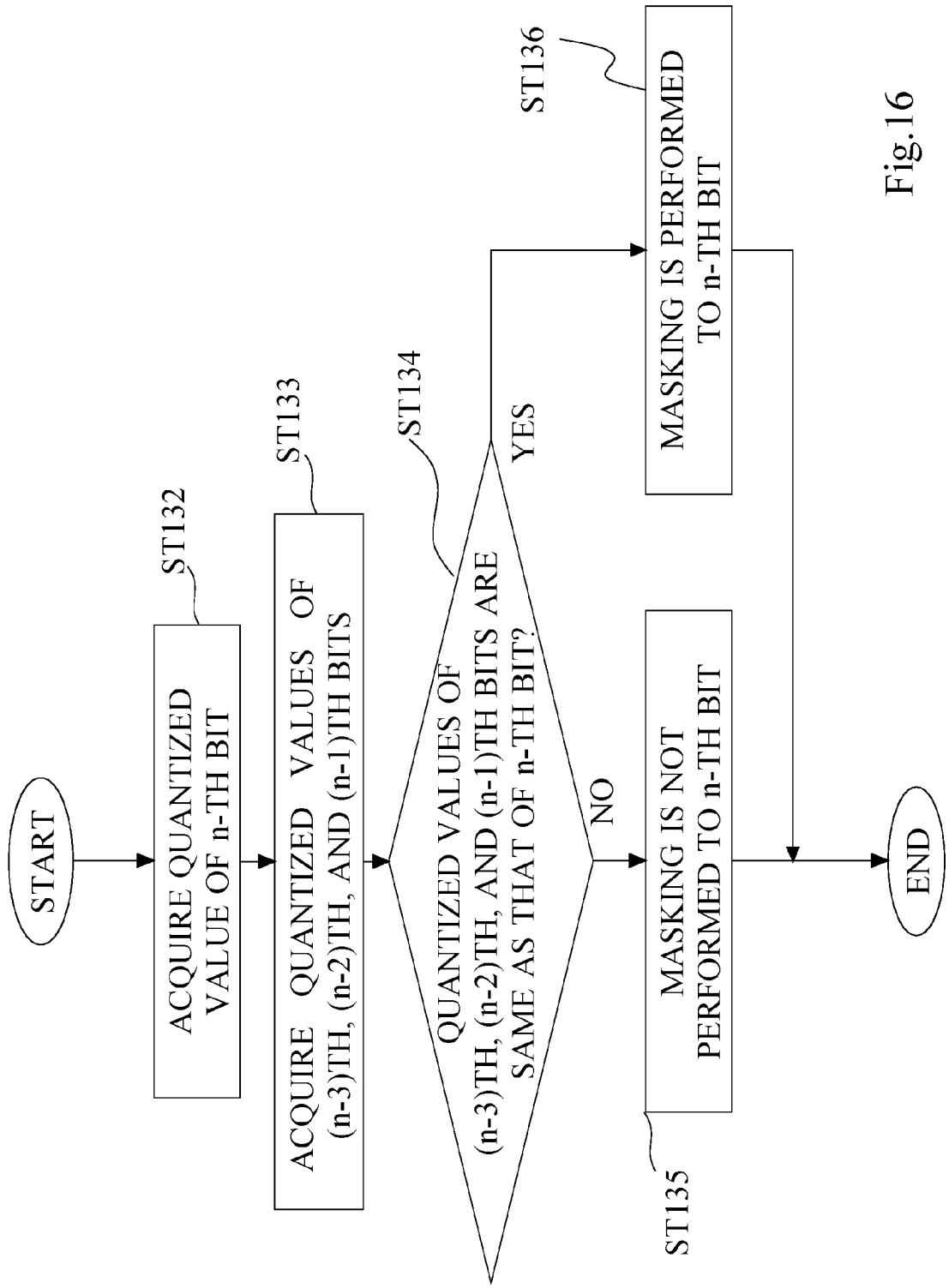
FIG. 16 is a flowchart explaining the third exemplary embodiment.

With reference to flowcharts in FIGS. 15 to 17, a third exemplary embodiment is described below.

In the second exemplary embodiment, the dirt determination has been described.

By the dirt determination (ST130), a reliable quantized value and an unreliable quantized value can be distinguished. Thus, when a predetermined number of reliable quantized values are obtained, the quantization processing and the dirt determination processing may be terminated.

To avoid overlapped descriptions, the same step numbers are attached to the processing steps common to those in the second exemplary embodiment. The processing is briefly described in order.

In ST110, detection images are acquired from a light receiving part 330. Then, a quantization unit 520 quantizes the detection images. In the present exemplary embodiment, all of the detection images are not quantized at once, but the required detection images are sequentially quantized.

To perform dirt determination (ST130A), first, the quantization is performed from the first bit to the fourth bit (ST111 to ST123). Then, when the quantization is performed to the fourth bit (ST122), the dirt determination is performed to the fourth bit (ST130A).

The procedure of the dirt determination is the same as that in the second exemplary embodiment. As illustrated in FIG. 16 again, when the dirt determination is performed to the target bit (the n-th bit), the dirt determination is temporarily terminated.

Returning back to FIG. 15, following the dirt determination (ST130A), whether a termination condition is satisfied is determined (ST140).

Termination condition determination (ST140) is shown in the flowchart in FIG. 17.

As the termination condition, whether the number of bits to which the masking is not performed is equal to or more than a predetermined number (here, 40) is determined (ST141).

The predetermined number (here, 40) is the number of bits necessary for the correlation calculation. The predetermined number is referred to as a calculable number.

Note that, taking the error rate of the dirt determination (ST130A) into consideration, it is preferable that the predetermined number (calculable number) is set so that the theoretical minimum number has a margin. For example, it is assumed that the theoretical minimum number is 20, here, the calculable number is 40 which is twice the theoretical minimum number.

When the present embodiment is not used, it is common to have redundancy to be about four times the theoretical minimum number. In the present embodiment, the calculable number may be set within a range so as to be one to three times the theoretical minimum number. Preferably, the calculable number is to be 1.5 to 2.5 times the theoretical minimum number, and more preferably, to be 1.5 to 2.0 times. Naturally, when the accuracy of the dirt determination is extremely high, the calculable number can be set within a range so as to be 1.1 to 1.3 times the theoretical minimum number.

When the data necessary for the correlation calculation is prepared (ST141: YES), the quantization (and the dirt determination) is terminated (ST140: YES), and the processing proceeds to the coding (ST150).

On the other hand, when the number of the bits to which the masking is not performed does not reach the predetermined number (ST141: NO), whether the parameter n reaches the upper limit of the number of bits is determined (ST142).

When the number of bits reaches the upper limit, the processing is terminated (ST142: YES).

When the data necessary for the correlation calculation is not obtained (ST141: NO) and the number of bits reaches the upper limit (ST142: YES), the scale becomes too dirty, and the reliable correlation calculation cannot be performed. Therefore, an alert of scale dirt is notified to a user (ST143).

When the parameter n does not reach the upper limit of the number of bits (ST142: NO), the quantization (ST121) and the dirt determination (ST130A) are successively performed (ST140: NO, ST145).

Following the coding (ST150), the correlation calculation (ST160) is the same as that in the second exemplary embodiment, and the description thereof is omitted.

According to the third exemplary embodiment, when the quantized values, having high reliability, necessary for the correlation calculation are obtained, the processing of the quantization and coding is terminated. Thus, it is possible to accelerate the calculation processing and reduce the load on the signal processing unit.

Furthermore, the number of codes used for the correlation calculation is reduced, the effects on accelerating the calculation processing and reducing the load on the signal processing unit are remarkably large.

Note that, the present invention is not limited to the above embodiments, and can be changed without deviating from the scope. In the above embodiments, it has been exemplified that the ABS scale is reflective, but the ABS scale may be transmissive.

It has been described that the masking is not performed when the reliability of the quantized values is high (ST135), and the masking is performed when the quantized values are not reliable (ST136), but this is merely an example. A flag indicating high reliability or unreliability may be used, any means can be used as long as the similar effect is obtained.

In the above embodiments, a linear scale and encoder have been exemplified, but the present invention can be applied to a rotary encoder.

The invention claimed is:

1. A scale used for an absolute position detection type photoelectric encoder, the scale comprising:
   a two-level code pattern, according to a pseudo random code sequence, provided along a length measurement direction,
   wherein codes in the two-level code pattern each consist of a combination of two bits, and three or more two-bit combination patterns are used to represent the codes in the two-level code pattern.

2. The scale according to claim 1, wherein:
   each of the codes of the two-level code pattern indicates a code "1" or a code "0",
   each of the two bits is a light transmitting bit (L) or a light reflecting bit (H),
   the number of continuous L in the two-level code pattern is equal to or less than a predetermined upper limit value, and
   the number of continuous H in the two-level code pattern is equal to or less than the predetermined upper limit value.

3. The scale according to claim 2, wherein:
   the code "0" is represented by two or more of the two-bit combination patterns, and
   a two-bit combination pattern different from a previous two-bit combination pattern is used for each successive code "0" in the two-level code pattern.

4. The scale according to claim 2, wherein:
   the code "1" is represented by an A pattern which is a combination of L and H,
   the code "0" is represented by a B pattern which is a combination of L and L, or by a C pattern which is a combination of H and H, and
   the B pattern and the C pattern are alternately used for each successive code "0" in the two-level code pattern.

5. The scale according to claim 1, wherein:
   each of the codes of the two-level code pattern indicates a code "1" or a code "0",
   each of the two bits is a light transmitting bit (L), a light reflecting bit (H), or a halftone bit (M),
   the code "1" is represented by an A pattern which is a combination of L and H,
   the code "0" is represented by two or more patterns selected from a B pattern which is a combination of L and L, a C pattern which is a combination of H and H, and a D pattern which is a combination of M and M, and
   a two-bit combination pattern different from a previous two-bit combination pattern is used for each successive code "0" in the two-level code pattern.

6. The scale according to claim 3, wherein the code "1" and the code "0" are replaceable with each other.

7. A photoelectric encoder comprising:
   the scale according to claim 1; and
   a detection unit provided to be relatively movable along the scale and configured to detect an absolute position on the scale based on the pseudo random code sequence on the scale.

* * * * *